(12) United States Patent
Maeda

(10) Patent No.: US 8,944,448 B2
(45) Date of Patent: Feb. 3, 2015

(54) TROCHOID DRIVE SYSTEM AND MOVING BODY

(75) Inventor: Taro Maeda, Osaka (JP)

(73) Assignee: Osaka University, Osaka (JP)

( * ) Notice: Subject to any disclaimer, the term of this patent is extended or adjusted under 35 U.S.C. 154(b) by 0 days.

(21) Appl. No.: 14/118,734

(22) PCT Filed: May 11, 2012

(86) PCT No.: PCT/JP2012/062100
§ 371 (c)(1),
(2), (4) Date: Nov. 19, 2013

(87) PCT Pub. No.: WO2012/160992
PCT Pub. Date: Nov. 29, 2012

(65) Prior Publication Data
US 2014/0110915 A1    Apr. 24, 2014

(30) Foreign Application Priority Data

May 25, 2011 (JP) .................................. 2011-117496

(51) Int. Cl.
*B62D 7/09* (2006.01)
*B62D 3/02* (2006.01)
(Continued)

(52) U.S. Cl.
CPC *B62D 3/02* (2013.01); *A61G 5/046* (2013.01); *F16H 21/46* (2013.01); *A61G 2005/1051* (2013.01)
USPC .................................................... 280/93.506

(58) Field of Classification Search
CPC ............ B62D 3/02; F16H 21/46; A61G 5/06; A61G 2005/1051
USPC ............................ 280/93.502, 93.506, 93.507
See application file for complete search history.

(56) References Cited

U.S. PATENT DOCUMENTS

| 4,563,015 A | * | 1/1986 | Lenhard-Backhaus et al. ....................... 280/93.507 |
| 5,139,279 A | * | 8/1992 | Roberts ....................... 180/409 |

(Continued)

FOREIGN PATENT DOCUMENTS

| JP | 8-156545 | 6/1996 |
| JP | 2000-033876 | 2/2000 |

(Continued)

OTHER PUBLICATIONS

Taro Maeda, Hideyuki Ando, A rotating mechanism for realizing ageometrically complete trochoid trajectory: A mechanism for omnidirectional mobility without omniwheels (in Japanese) Robotics Mechatronics lectures, 10, 2A2-D11.

(Continued)

*Primary Examiner* — Paul N Dickson
*Assistant Examiner* — Robert A Coker
(74) *Attorney, Agent, or Firm* — Jordan and Hamburg LLP

(57) ABSTRACT

A trochoid drive system includes: a supporting part to support one wheel having a wheel axle perpendicular to a steering axle that is spaced from an output axle and turns about the output axle; and a steering part that turns in synchronization with the steering axle, the steering part being configured so that a position thereof relative to the output axle is displaceable on a turning plane. The steering part includes: a first link system configured to adjust a steering angle q of the wheel by rotating the wheel axle about the steering axle in association with the displacement; and a second link system jointed to the first link system to adjust a camber angle of the wheel by tilting the wheel axle by an angle corresponding to the steering angle on a plane perpendicular to a plane parallel to the steering angle.

6 Claims, 13 Drawing Sheets

(51) Int. Cl.
*A61G 5/04* (2013.01)
*F16H 21/46* (2006.01)
*A61G 5/10* (2006.01)

(56) References Cited

U.S. PATENT DOCUMENTS

| | | | |
|---|---|---|---|
| 5,752,710 A * | 5/1998 | Roberts | 280/91.1 |
| 5,993,157 A | 11/1999 | Perfahl | |
| 6,408,230 B2 * | 6/2002 | Wada | 701/1 |
| 6,491,127 B1 * | 12/2002 | Holmberg et al. | 180/252 |
| 7,922,184 B2 * | 4/2011 | Porcheron | 280/93.506 |

FOREIGN PATENT DOCUMENTS

| | | |
|---|---|---|
| JP | 2004-224147 | 8/2004 |
| JP | 2007-118749 | 5/2007 |
| JP | 2008-007013 | 1/2008 |
| JP | 2010-263767 | 11/2010 |

OTHER PUBLICATIONS

Roy.P.Gibbens "Construction and flying as radio controlled ligter than aircraft powered by cycloidal propellers"4th International Airship Convention and Exhibition,2002,PaperA-1.

Virginia Downward & William M.Clark "Vertical Paddle Propeller Wheel" 1930 pp. 1-2.

Ken Nakazawa, Chapter 4 "Propulsion system based on meandering motion (in Japanese)" p. 46, Figs. 4, 8, Edited by Society of Biomechanisms Japan, "Biomehanisms learned from living things New idea of the machine systems architecture(in Japanese)" Kogyo Chosakai Publishing Co., Ltd, 1987.

\* cited by examiner

VELOCITY RELATION: $\vec{v}_w = \vec{v}_m + \vec{v}_d$

LINK CONNECTION: $\vec{d}_w = \vec{d}_m + \vec{d}_0$

LINK CONNECTION THIS TIME: $a : b : r = |\vec{v}_m| : |\vec{v}_r| : |\vec{v}_d|$ Fig. 9A
Fig. 9B
Fig. 9C
THREE WHEELS
TRAILING WHEEL CONTROL
TORUS WHEEL & MULTIPLE CONTRA-ROTATING
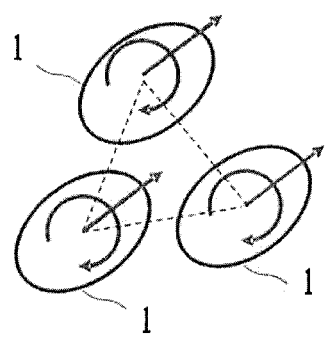
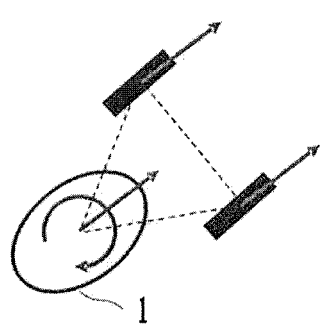
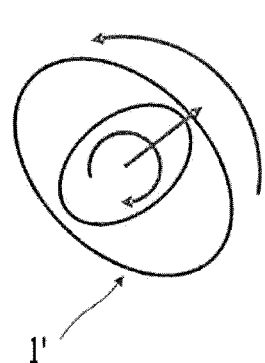

8,944,448 B2

TROCHOID DRIVE SYSTEM AND MOVING BODY

TECHNICAL FIELD

The present invention relates to a trochoid drive system that drives a wheel in a trajectory along a trochoid curve (including a driving system for a trochoid curve itself as well as similar to this) and a moving body.

BACKGROUND OF THE INVENTION

Patent Literature 1 proposes a technique of using a trochoid propulsion system to move a legless-chair type vehicle omni-directionally on the floor, the vehicle including eight casters exposed downward and a pair of antislip rear wheels. This system includes the eight casters uniformly arranged around a pivot of a turning cylinder and allows a tie rod engaged with each of the eight casters to steer the rotating directions of the eight casters. More specifically, the tie rod corresponding to each caster is configured to be integrally rotatable with a central base, and in the state where the central base and the pivot coincide with each other in their positions, the cylinder simply turns and the vehicle is in a stopped state. On the other hand, when a steering operation is performed to decenter the position of the central base from the pivot on the horizontal plane, the vehicle travels in a translational mode in the decentering direction while letting the casters turn. Similarly, Non-Patent Literature 1 also discloses an omni-directional drive system including a plurality of passive wheels equipped with steering mechanism that are arranged circumferentially around a vertical rotative driving axle.

Patent Literatures 2, 3 and Non-Patent Literatures 2, 3 disclose a propulsion system having a propulsion principle similar to that of a helicopter, a cycloidal or a propeller and having an axisymmetric omni-directional property, and especially disclose a system to continuously change the translational velocity. Non Patent Literature 4 describes a propulsion, system based on a meandering motion equipped with a system to adjust the camber angle.

CITATION LIST

Patent Literature

Patent Literature 1: Japanese Patent Application Laid-Open No. 2000-33876
Patent Literature 2: Japanese Patent Application Laid-Open No. 2004-224147
Patent Literature 3: U.S. Pat. No. 5,993,157

Non Patent Literature

Non Patent Literature 1: Taro MAEDA, Hideyuki ANDO, "A rotating mechanism for realizing ageometrically complete trochoid trajectory: A mechanism for omnidirectional mobility without omniwheels (in Japanese)" Robotics Mechatronics lectures, 10, 2A2-D11
Non Patent Literature 2: Roy P. Gibbens, "Construction and flying a radio controlled lighter than aircraft powered by cycloidal propellers" 4th. International Airship Convention and Exhibition, 2002, PaperA-1
Non Patent Literature 3: Virginia Downward & William M. Clark, "Vertical Paddle Propeller Wheel"1930
Non Patent Literature 4: Ken NAKAZAWA, Chapter 4 "Propulsion system based on meandering motion (in Japanese)" page 46, FIGS. 4, 8, Edited by Society of Biomechanisms Japan, "Biomehanisms learned from living things New idea of the machine systems architecture (in Japanese)" Kogyo Chosakai Publishing Co., Ltd, 1987

SUMMARY OF THE INVENTION

It is required for the omni-directional movement in a plane to implement a trajectory along a trochoid curve as a geometrical solution of linear movement through a continuous action of a rotating system. Actually, however, the trochoid curve is reproduced as a quasi-solution as in Patent Literature 1, and so in the case of traveling by caster-driving, there is a problem of large friction loss due to slip, which means an inefficient component against the floor during the action in the rotating direction and the action in the translational direction of the casters. Therefore practical applications are limited to propellers or the like under the fluid environment that is less influenced by friction due to slip as shown in Patent Literatures 2, 3 and Non-Patent Literatures 2, 3. The meander propulsion system shown in Non-Patent Literature 4 also has a problem that the curvature radius to set the camber angle can be obtained only as a quasi-solution.

Then the present inventors have proposed a low-loss trochoid drive system that realizes a geometric complete solution of a trochoid curve with a system including simple mechanical elements (Japanese Patent Application No. 2010-134580). Non-Patent Literature 1 also describes the related content. This trochoid drive system is configured to revolve three wheels as trailing wheels provided around a driving axle with constant velocity while steering a steering part two-dimensionally, whereby the steering angles of the three wheels are individually adjusted by a link system, and so the system as a whole moves in a translational manner in the designated direction.

The trochoid drive system described in Non-Patent Literature 1, however, has a fixed camber angle, and so receives large steering resistance to travel along a curve, which lowers the travelling efficiency of the system. Further, one of applications of such a trochoid propulsion system may be a wheelchair, where the space that a wheelchair can occupy is specified as L120×W70×H109[cm] or less by the standards (for electrical wheelchairs JIS T9203(wheelchair), for manual and electrical wheelchairs: ISO7193, 7176/5(wheelchair)). Herein one of the important functions of wheelchairs is to climb the stairs (step-climbing) of 20 cm in rise and 40 degrees in obliquity, for example, and to implement such a function, larger-diameter wheels are desired. However, considering the above standards, there is a limit on the system to revolve three wheels around a driving axle.

In view of this, it is an object of the present invention to provide a wheel-turning type trochoid drive system capable of improving the travelling efficiency by adjusting the steering angle and the camber angle of a wheel in a mechanically ganged manner and a similar driving system, and to provide a moving body using the same.

Solution to Problem

A trochoid drive system that is an invention includes: a supporting part to support a trailing-type wheel having a wheel axle perpendicular to a steering axle that is located at a predetermined distance from a driving axle, turns about the driving axle, and is parallel to the driving axle; and a steering part that turns in synchronization with the steering axle, the steering part being configured so that a position thereof relative to the driving axle is displaceable on a turning plane. The steering part includes: a first link system configured to adjust a steering angle of the wheel by rotating the wheel axle about the steering axle in association with the displacement; and a second link system jointed to the first link system to adjust a camber angle of the wheel by tilting the wheel axle by an angle corresponding to the steering angle on a plane perpendicular to a plane parallel to the steering angle.

This invention enables movement on a turning plane by a trochoid drive system configured to turn one wheel, instead of a trochoid drive system to revolve three wheels. That is, the wheel turns about the driving axle, and so is always in contact with the floor surface. The steering part co-rotates with the turning of the wheel. The steering part can move relatively (can be steered) on the turning plane, and without a steering operation, the wheel simply turns about the driving axle on the floor surface along the turning direction. That is, the first link system rotates the wheel about the driving axle at a preset steering angle while setting the grounding point of the wheel at immediately below the steering axle. When a steering operation is performed, the steering angle is newly set, which always changes with the turning of the wheel about the driving axle. Thereby, the drive system moves in the steering direction. The camber angle of the wheel is then changed in accordance with a change of the steering angle by the second link system, i.e., in synchronization with the turning of the wheel. This means mechanically ganged manner adjustment of the steering angle and the camber angle of the wheel, thus reducing friction resistance during travelling and improving the travelling efficiency of the driving system.

The present invention can improve the travelling efficiency of the system by adjusting the steering angle and the camber angle of a wheel in a mechanically ganged manner.

BRIEF DESCRIPTION OF THE DRAWINGS

FIG. 2A is a plan view, FIG. 2B is a side view and FIG. 2C is a front view.

FIG. 3A explains a camber angle and FIG. 3B explains how to adjust an angle using a link system of a camber angle when the wheel rotates.

FIG. 4A shows a velocity relation, FIG. 4B shows a link connection in the prior application of the present applicant, and FIG. 4C shows a link connection this time.

FIGS. 9A to 9C schematically show a configuration including additional grounding points: FIG. 9A shows a three-wheel configuration, FIG. 5D shows a configuration to control trailing-wheels, and FIG. 9C shows a configuration of a torus wheel and a multiple contra-rotating configuration.

DESCRIPTION OF THE PREFERRED EMBODIMENTS

To begin with, the following describes the action of a geometrical complete solution of a trochoid curve and the link system, based on Japanese Patent Application No. 2010-134580 that is the prior application of the present applicant. Assume herein an omni-directional mobile system including a plurality of wheels along the circumference around a vertical driving axle. This system has a propulsion principle similar to that of a helicopter, a cycloidal or a propeller and is a propulsion system having an axisymmetric omni-directional property. The system has another feature of functioning as a system to continuously change the translational velocity as the axle rotates.

Figure 1:
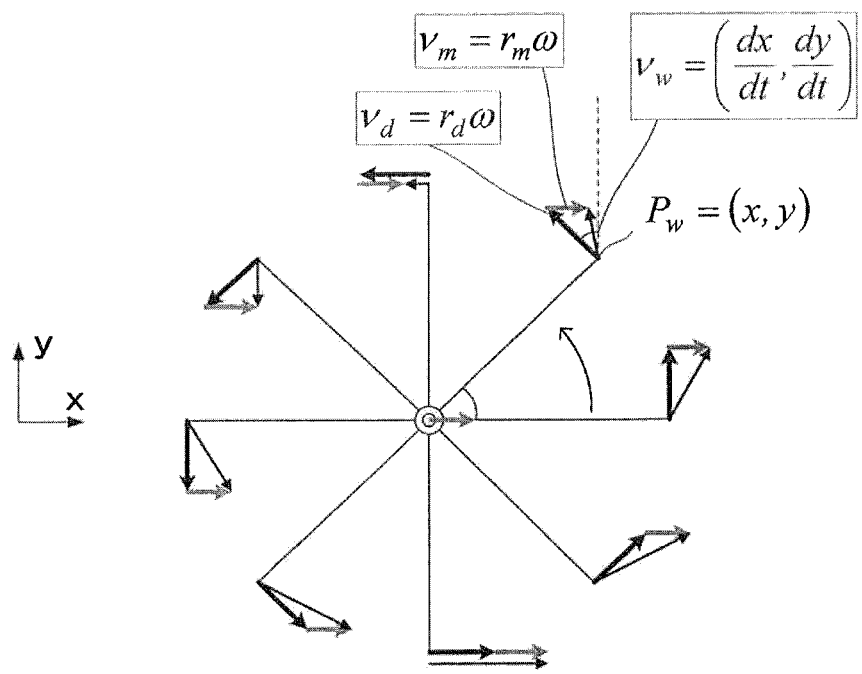
FIG. 1 shows a steering angle required for each wheel of a system when the system moves in a translational manner in a specific direction with constant angular velocity ω.

FIG. 1 illustrates steering angles required for the wheels in this system when the system moves in a translational manner in a specific direction with constant angular velocity ω. Each wheel is located at the position of radius $r_d$ from the center (driving axle). In FIG. 1, the velocity vectors include a tangential velocity $v_d$ around the driving axle of each wheel, a translational velocity $v_m$ of the rotating center and a progression velocity $v_w$ of each wheel. The tangential velocity $v_d$ of the wheel can be implemented by a motor not illustrated. Then, in order to establish a mutual relation among these velocity vectors to implement the trochoid motion, i.e., $v_w = v_d + v_m$, the direction of the steering angle of each wheel has to be directed always in the same direction as that of $V_W$. This means that such a system can be an omni-directional mobile system when the steering angle of each wheel is always directed to the tangential direction on the trochoid curve.

Assuming $v_d = r_d \cdot \omega$, $v_m = r_m \cdot \omega$, $v_w = (dx/dt, dy/dt)$ and $p_w = (x, y)$ in Mathematical Expression 1 indicating a trochoid curve and FIG. 1, this relation can be found by analysis as in Mathematical Expression 3 as well, based on Mathematical Expression 2 obtained by temporal differentiation of the trochoid curve of Mathematical Expression 1. In these expressions, $r_m$ denotes an eccentric amount.

$$\begin{cases} x = r_m \omega t + r_d \cos \omega t \\ y = r_m + r_d \sin \omega t \end{cases} \quad [\text{Math. 1}]$$

$$\begin{cases} \dfrac{dx}{dt} = r_m \omega - r_d \omega \sin \omega t \\ \dfrac{dy}{dt} = r_d \omega \cos \omega t \end{cases} \quad [\text{Math. 2}]$$

$$\begin{cases} \dfrac{dx}{dt} = v_m \omega - v_d \omega \sin \omega t \\ \dfrac{dy}{dt} = v_d \omega \cos \omega t \end{cases} \quad [\text{Math. 3}]$$

Figure 2A:
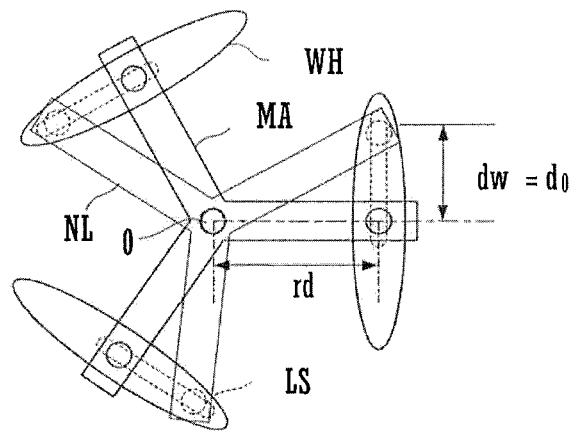
FIGS. 2A to 2C are a conceptual diagram illustrating an exemplary propulsion, system using the trochoid curve shown in FIG. 1.
Figure 2B:
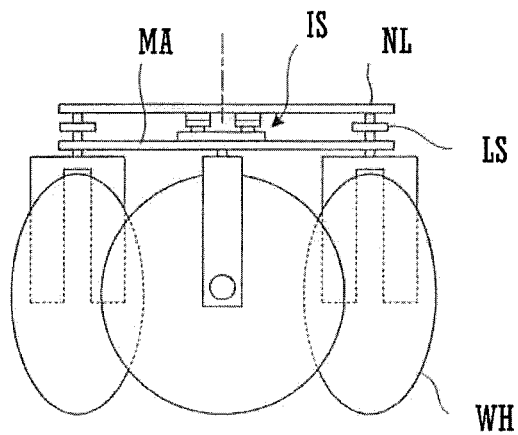
Figure 2C:
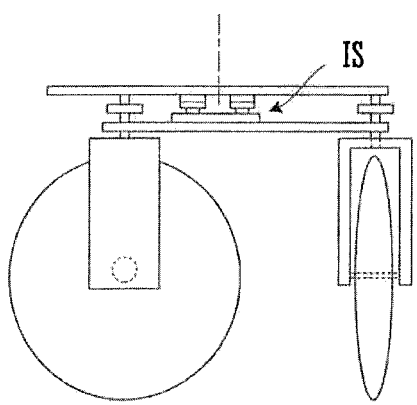

Next, FIGS. 2A to 2C are a conceptual diagram illustrating an exemplary propulsion system using the trochoid curve shown in FIG. 1: FIG. 2A is a plan view, FIG. 2B is a side view and FIG. 2C is a front view. In the propulsion system shown in FIGS. 2A to 2C, the steering angle of each wheel WH is determined by two-dimensional (omni-directional in the plane) eccentric movement of a steering link plate NL with reference to a main arm MA to turn each wheel WH. The two-dimensional eccentric movement can be implemented, by a parallel-crosses shaped slider IS, for example. The steering link plate NL is coupled to the main arm MA via the parallel-crosses shaped slider IS or a linear slider LS, and co-rotates, i.e., rotates at the same phase while moving the rotating center horizontally. The linear slider LS couples the leading end of the main arm MA and the leading end of the steering link plate NL, and changes the direction of the linear slider LS in accordance with the eccentric movement. The leading end position of the steering link plate NL at the eccentric amount ds=0 illustrated in FIGS. 2A to 2C is set at a forward constant distance $d_w$-$d0$ in the tangential direction of the turning circumference of the main arm MA from the rotating center of the steering angle of the wheel WH. Herein, this leading end position and the turning center are connected by the linear slider LS, and then the system is configured so that the direction thereof is directed to the direction of the steering angle of the wheel WH.

In this way, for omni-directional movement in the plane, a trajectory along a trochoid curve is effective as a geometrical solution of linear movement by a continuous rotating system. A quasi-solution by an existing system, however, has large friction loss for use as wheel driving, and so practical applications thereof are limited to a propeller under the fluid environment or the like. The prior application by the present applicant is to implement a geometric complete solution of a trochoid curve by a system including relatively simple mechanical elements.

Then, the following describes a system equipped with a function to control a camber angle in addition to the function of the prior application of the present applicant, thus eliminating steering loss of a wheel, and next describes a method to greatly improve the ability to climb a step, which is a disadvantage of a wheel-type omni-directional system, using such a system. The prior application of the present applicant assumes an omni-directional mobile system including a plurality of passive wheels with steering systems along the circumference around a vertical rotative driving axle. This system enables the generation of steering angles that completely follow a trochoid curve in the traveling plane, but just suggests the possibility of designing of a system to give a camber angle along the curvature radius when the wheels are subjected to steering along such a curve. When the camber angle is fixed, large steering resistance remains to travel along a curve. Then, the following describes a system to control a camber angle concurrently with a steering angle.

Figure 3A:
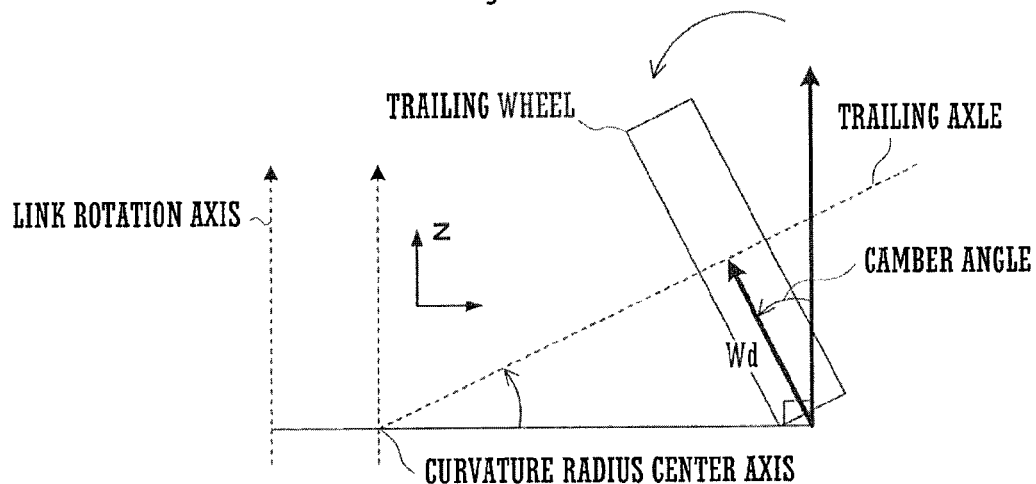
FIGS. 3A and 3B show a method to direct a camber angle in the direction that is found using two steering angle generation systems.
Figure 3B:
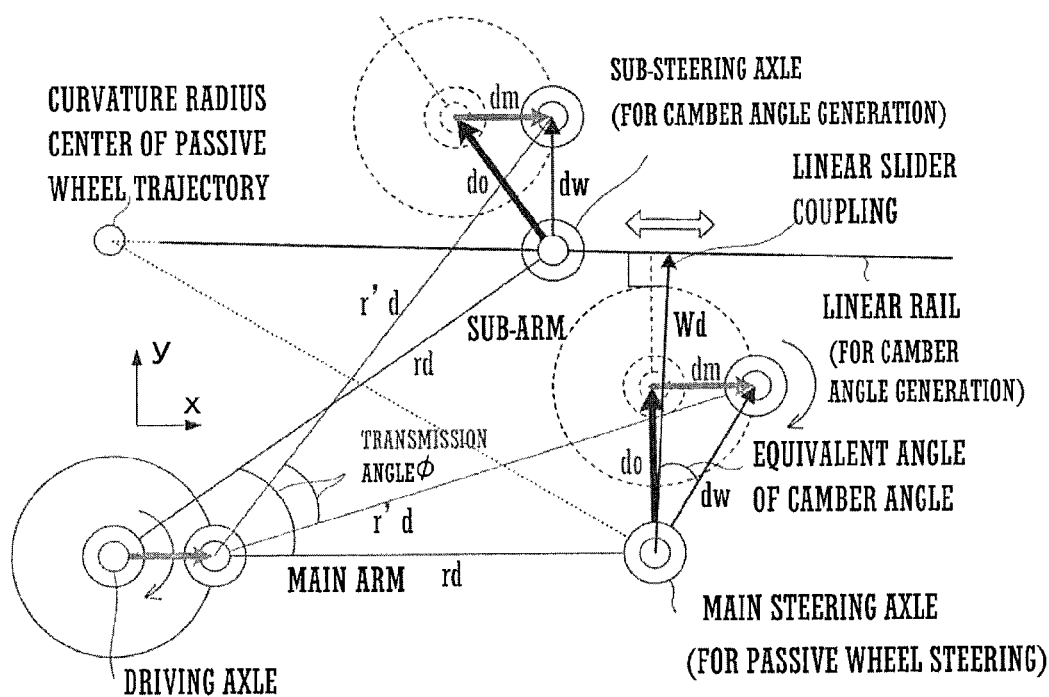

FIGS. 3A and 3B show a method to direct a camber angle in the direction that is found using two steering angle generation systems: FIG. 3A explains a camber angle and FIG. 3B explains how to adjust an angle using a link system of a camber angle when the wheel rotates. As one method to generate a camber angle, the method as shown in FIGS. 3A and 3B can be considered based on the prior application of the present applicant, where two steering angle generation systems are used. The curvature radius and the rotation center of the trochoid curve trajectory are found from a difference in steering angle between the two systems, and the camber angle is then directed to the direction. Specifically, the position of a sub-steering axle is not fixed in this method, and the sub-steering axle rotates around a driving axle in the plane of a main arm with the radius of $r_d$.

A relative angle φ (transmission angle in FIGS. 3A and 3B) with a main steering axle is transmitted from the main arm side to the steering link side, whereby the steering direction $d_w$ of the sub-steering axle can be found, and accordingly the direction of a perpendicular linear rail can be found. Perpendicular engagement of the linear slider with a link arm having the same length as the radius $W_d$ of the passive wheel extending from the main steering axle can find the camber angle of the passive wheel as an intersection angle between the direction of the radius $W_d$ of the passive wheel and the direction $d_w$ of the main steering axle. This system is excellent in the ability to generate a camber angle from a trochoid propulsion mode to a glide propulsion mode. However, unless the wheel has the radius $W_d$ sufficiently smaller than the radius $r_d$ of the main arm, it is difficult to keep the accuracy.

Further as described later, strictly speaking, the curvature radius obtained from this system is a quasi solution. Then, when the system is operated only under the glide propulsion condition of $r_d \approx W_d$ to prioritize the ability to climb a step as described later, the system is preferably not limited to those of FIGS. 3A and 3B but another system is preferably examined. As such, FIGS. 4A to 4C show a modification proposal for the steering system to be used this time.

Figure 4A:
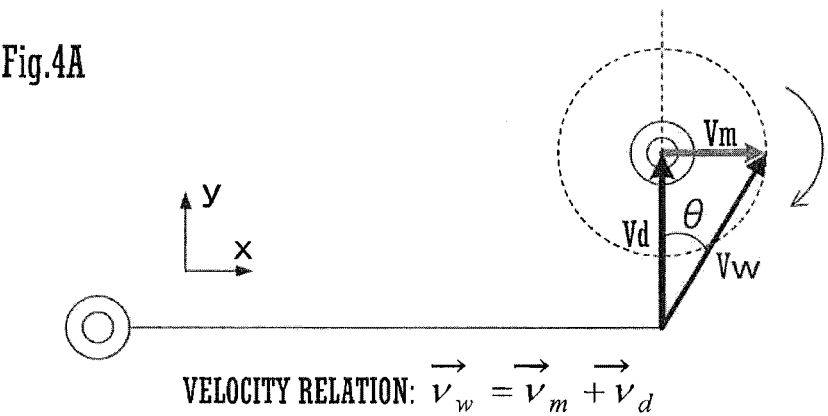
FIGS. 4A to 4C show an example of a modification proposal for the steering system this time, which explains a relation between velocity and each link system viewed from the surrounding of a wheel steering angle system (driving arm coordinate system) as a rotation system.
Figure 4B:
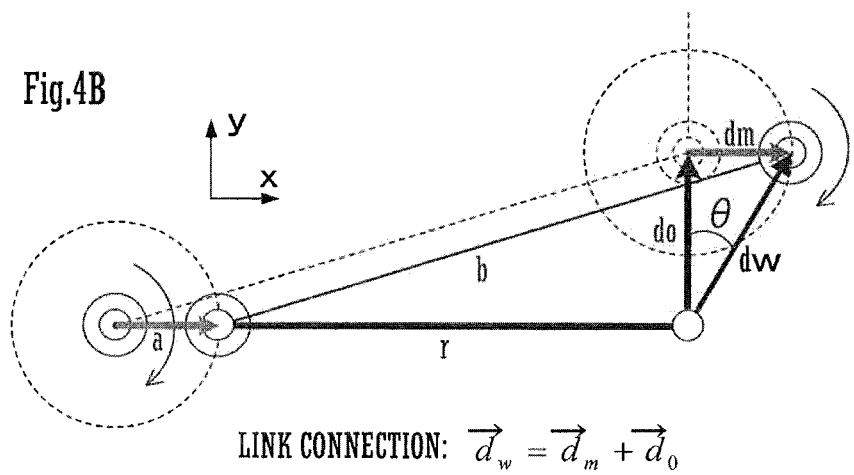
Figure 4C:
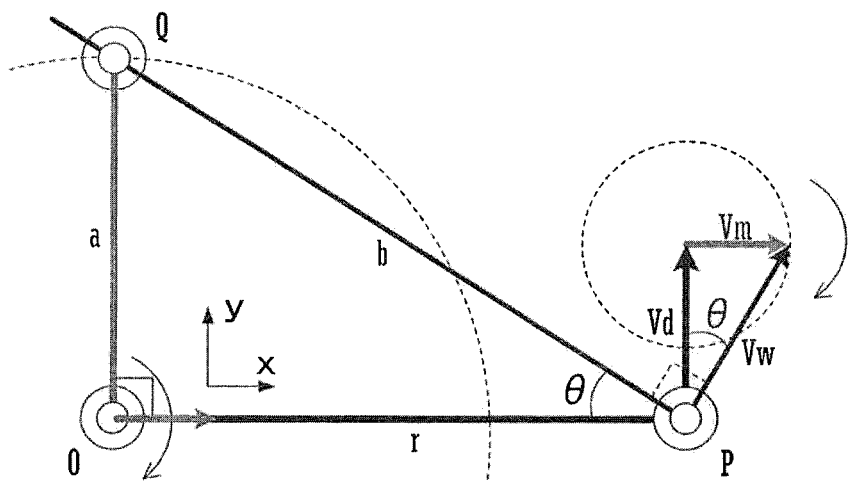

FIGS. 4A to 4C show an example of a modification proposal for the steering system this time, which explains a relation between velocity and each link system viewed from the surrounding of a wheel steering angle system (driving arm coordinate system) as a rotation system: FIG. 4A shows a velocity relation, FIG. 4B shows a link connection in the prior application of the present applicant, and FIG. 4C shows a link connection this time. The link system shown in FIG. 4C functions equivalently to FIG. 4B. Delaying the phase of the shifting direction of shifting amount vector a in the link system of FIG. 4C by 90° relative to driving arm vector r and shifting amount vector a of the steering link center in FIG. 4B (advancing in a world coordinate system) enables the configuration of a link system making up a shape similar to the triangle made up of three velocity vectors $v_d$, $v_m$ and $v_w$, whereby the system can manipulate vm as the moving velocity vector of the system as a whole and the shifting amount vector a while keeping a complete proportional relation therebetween (other than offset of the direction). At this time, since side b of FIG. 4C agrees with the wheel axle of the trailing wheel, this is manipulated vertically (z-axis), whereby the system can be developed so as to manipulate not only the steering angle θ but also the camber angle concurrently. Herein, assuming that the linking operations in FIG. 4E and FIG. 4C have equivalence, then it can be understood that the center of the curvature of the trajectory of the passive trail in the system of FIGS. 3A and 3B and the node Q of the sides a and b in FIG. 4C are identical. That is, the system of FIG. 4C can be considered as a successfully and greatly simplified system of FIGS. 3A and 3B. Then, the following verifies analytically whether this node Q is the curvature center or not. Firstly, the curvature radius is found analytically based on Mathematical Expression 1 that is an analysis formula of a trochoid curve. Positional vector p is defined based on Mathematical Expression 1, and velocity vector v is defined used on Mathematical Expression 2. Then, based on them, acceleration vector a is defined as in Mathematical Expression 4.

$$\begin{cases} \dfrac{d^2x}{dt^2} = -v_d \omega \cos\omega t \\ \dfrac{d^2y}{dt^2} = -v_d \omega \sin\omega t \end{cases} \quad \text{[Math. 4]}$$

Then the curvature vector can be represented as in Mathematical Expression 5.

$$\dfrac{\vec{n}}{R} = \dfrac{1}{|\vec{v}|^2}\left(\vec{a} - \dfrac{\vec{a}\cdot\vec{v}}{|\vec{v}|}\cdot\dfrac{\vec{v}}{|\vec{v}|}\right) \quad \text{[Math. 5]}$$

Herein, the vector n is unit vector in the direction toward the curvature center, and R denotes the curvature radius. Since the curvature center is always on the line passing through the side b, the value of the curvature radius R may be found in this case. Mathematical Expressions (2) and (4) are assigned to Mathematical Expression (5) to find the curvature radius R, which is further then rearranged based on the second law of cosines and using three velocity vectors, and then Mathematical Expression (6) can be obtained as follows.

$$R = \dfrac{v_w^3}{v_d\omega(v_d - v_m\sin\omega t)} \quad \text{[Math. 6]}$$

At this time, the relation between each velocity and each link length will be $v_m=a\omega$, $v_w=b\omega$ and $v_d=r\omega$ from the relational expression of the link system in FIG. 4C. Therefore the curvature radius R is represented using each link length, and the resultant is then rearranged using the steering angle θ based on the first law of cosines, whereby the curvature radius R can be finally represented as follows.

$$R = \dfrac{b^3}{r(r - a\sin\omega t)} = \dfrac{b^2}{r\cos\theta} \quad \text{[Math. 7]}$$

If the node Q shown in FIG. 4C agrees with the curvature center, then R=b, and so it can be understood that the system of FIGS. 3A and 3B is a quasi-solution. Meanwhile, a system to implement the curvature radius R as an exact solution can be the configuration of a link system as in FIG. 5.

Figure 5:
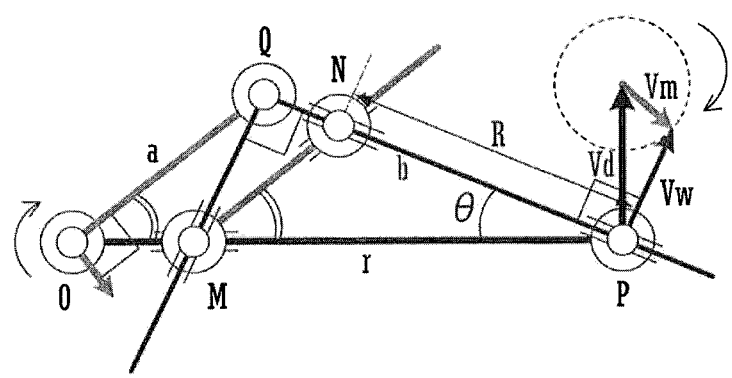
FIG. 5 explains a system to find an exact solution of the curvature center and the curvature radius.

FIG. 5 explains a system to find an exact solution of the curvature center and the curvature radius. For convenience of description, FIG. 5 shows a simplified system, and the system has to deal with 360°-rotation actually. In the drawing, parallel line segments having a predetermined length beside point P, point M and point N represent a linear slider. The same applies to FIGS. 11 and 12 described later. In FIG. 5, a link, extending from the node Q orthogonally to the side b intersects with the side r at point M, from which another link extends in parallel to the side a, and the link, intersects with the side b at point N. The curvature center is at the point N. Then, the distance from the steering axle P to the intersection N is the curvature radius R. A system to transmit the angle NMP to the angle QOP has to be added. The same applies to the transmission angle in FIGS. 3A and 3B. As shown in FIG. 3A, the camber angle is configured so that the wheel axle direction of the wheel always is directed to the rotation center on the grounding plane, and so the use of the position N found by this system can give a camber angle control function to the system of FIG. 4C. This system can be configured in a two-dimensional plane of FIG. 6 that is a vertical plane (side view) along the side b of FIG. 5.

Figure 6:
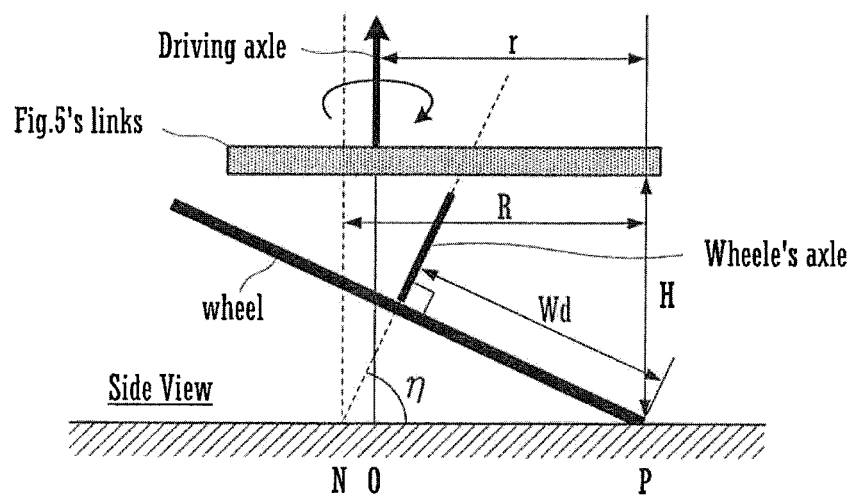
FIG. 6 corresponds to the vertical plane along the side b of FIG. 5, and explains a system to find, the camber angle from the position of the curvature center.

FIG. 6 corresponds to the vertical plane along the side b of FIG. 5, and explains a system to find the camber angle from the position of the curvature center. In FIG. 6, in a mode where the link system is disposed above, the curvature center and the grounding point are located at the floor face immediately below (In FIG. 6, this is referred to as a grounding point P) the intersection N and the steering axle P. The trailing wheel axle is on the line extending from the grounding point P and passing through N in contact with a circle having the wheel diameter $W_d$, where the center of the wheel equals to the intersection thereof. In the actual configuration, a wheel axle supporting system may be configured using a link system drawing the circles with the radiuses H and $W_d$ about the virtual centers of the intersection N and the grounding point P, respectively, to which a constraint condition to bring them to be perpendicular to each other is applied, whereby this intersection and the tangential direction are configured from the upper link side.

The following considers an actual configuration of a link system based on the design as stated above. Prior to this, the ability to climb a step by an omni-directional mobile system is considered, and finally a system to deal with this task as well as to control a camber angle is proposed. The ability to climb a step of a wheel travelling system is low unless an inertial force or a propulsion power from another driving wheel is given to the system.

Figure 7:
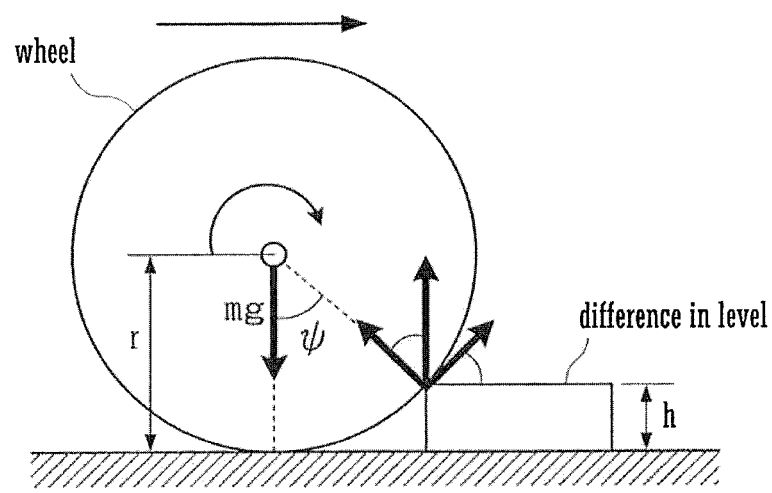
FIG. 7 explains a condition for a driving wheel at static velocity to climb a step.

FIG. 7 explains a condition to climb a step by a driving wheel at static velocity. In FIG. 7, r denotes the radius of a wheel, and m denotes the weight thereof. In the drawing, h denotes a step height (a difference in level), and the step height h where the wheel can climb can be calculated as in Mathematical Expression 8, where friction resistance μ between the wheel and the floor surface is 0.8 and the climbing-angle is 40° or less.

μmg·cos φ≥mg·sin φ

∴μ≥tan φ h=r(1−cos φ)

when μ=0.8,φ≤40°, h≤0.23r. [Math. 8]

That is, in FIG. 7, for the step-climbing task by a single wheel in a static state formulated as in Mathematical Expression 8, the system can climb a step corresponding to 23% of the wheel radius only, where a typical value of friction resistance μ=0.8 is assumed for a condition between dry asphalt (floor surface) and a rubber tire (wheel). To deal with the worst case of a step in stairs of "20 cm in rise and 40 degrees in obliquity" at a shared space that is specified by the JIS standards, for example (the space that a wheelchair can occupy is L120×W70×H109[cm] or less, JIS T9203(wheelchair) for electrical wheelchairs, ISO7193, 7176/5(wheelchair) for manual and electrical wheelchairs), the wheel has to have a radius of 87 cm (=20 cm/23%) or more, i.e., have a diameter of 174 cm or more. This size considerably exceeds the spatial dimensions specified by the JIS standards and the like. Then, the following considers a system that can give an omni-directional moving function to a personal mobile or the like to be used in such spatial dimensions and can implement a step-climbing movement.

Figure 8:
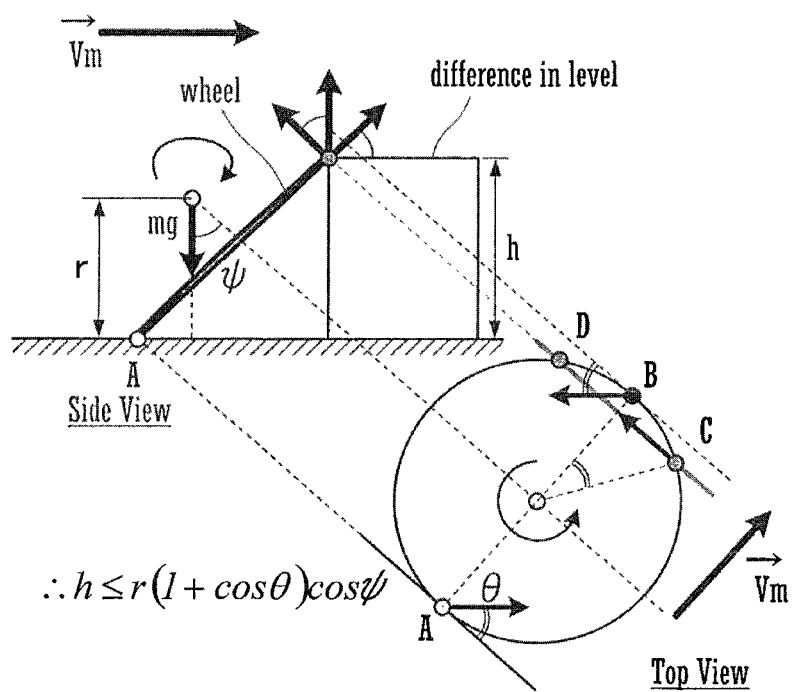
FIG. 8 explains a step-climbing condition of the present system.

To implement a system to meet the dimensional regulations such as the aforementioned JIS standards, trochoid drive system including a single wheel having a large radius and having a large camber angle is considered. This system has a feature that the single wheel has a radius close to the radius of rotation of a steering axle (from the driving axle to the steering axle), the wheel having a sufficiently large camber angle or a camber angle close to substantially vertical. Such a configuration including a wheel whose radius is close to substantially a total width of the width of the wheelchair, the wheel having a large camber angle, means the curvature radius in the vicinity of the grounding point of the wheel that is larger than the total height. For instance, when a wheel of 70 cm in diameter is used at a camber angle of 20°, the curvature radius at the grounding point becomes 102 cm, which is sufficiently larger than the diameter of the wheel. This enables quick wheel grounding in a distance longer than a moving distance, and so the disadvantage of the trochoid propulsion system that is susceptive to vibrations from the uneven floor surface can be alleviated. Further, since this system is configured to turn a single wheel, the wheel becomes completely flattened when the wheel is about to reach the rise for step climbing, i.e., the wheel comes into contact with the step with a substantially infinite curvature radius. Referring to FIG. 8, this state is described below.

FIG. 8 explains a step-climbing condition of the present system. In FIG. 8, at the moment when the wheel, which is turning for movement, comes into contact with the rise, the grounding point jumps from A to C. At this time, since the phase of the grounding point progresses, the propulsion direction of the wheel changes. The worst case is the grounding at point B, where the wheel cannot climb the rise because the propulsion direction is reversed. Conversely, unless the steering direction at point C is not reversed against the traveling direction, the wheel continues to advance until the phase of the steering axle arrives at point B while keeping the engagement at point C. Subsequently, the grounding point jumps to a horizontally symmetric point D of point C. At the point where the steering axle travels beyond point D by the phase θ equal to the steering angle, the wheel starts to more backward, which continues until the phase of the steering axle returns to the original point A and the grounding point jumps again to point C. Herein, assuming that the forward phase amount for one round always exceeds the backward phase amount thereof, i.e., assuming that the driving axle rotates with constant velocity, the duration of climbing becomes always longer than the duration of slipping during one rotation of the wheel. As a result, the forward amount is always more than the backward amount for one round, meaning that the overall center always moves forward from the original grounding point, and so the system as a whole keeps climbing the rise. The original engagement condition is represented as in the formula shown in FIG. 8, i.e., h≤r (1+cos θ)·cos ψ. Since the steering angle θ can be set at any small value by increasing the change gear ratio, assuming the friction coefficient condition of FIG. 7, it can be estimated by calculation that the present system having a wheel of 32 cm in diameter and having the maximum camber angle of 40° is able to climb a rise (step) of 20 cm in height ideally.

Due to its uniaxial horizontal rotation configuration, a trochoid drive system has to be configured to implement omni-directional moving while suppressing the rotation of the main body similarly to a helicopter. The present system includes a single wheel and so has an advantage of the simple configuration. On the other hand, for stable operation of the system without controlling its center of gravity, the system has to have at least one additional grounding point, preferably two or more points in addition to the one grounding point.

Figure 10:
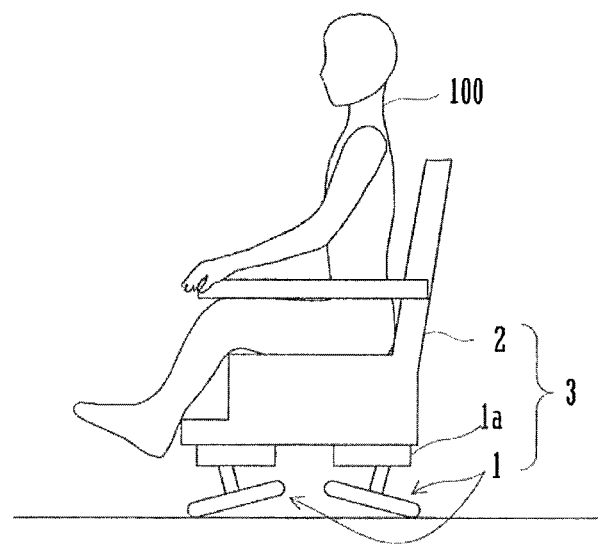
FIG. 10 is a schematic side view of a wheelchair, to which the mode of FIG. 9A is applied.

FIGS. 9A to 9C schematically show a configuration including additional grounding points: FIG. 9A shows a three-wheel configuration, FIG. 9B shows a configuration to control trailing-wheels, and FIG. 9C shows a configuration of a torus wheel and a multiple contra-rotating configuration. FIG. 10 is a schematic side view of a wheelchair 3 carrying a human 100, to which the mode of FIG. 9A is applied. In FIGS. 9A to 9C, ellipses are images of wheels rotating while having a camber angle, circular arrows indicate the turning directions of the wheels, and straight arrows indicate the moving direction. FIGS. 9A to 9C assume a configuration where the system is attached to a bottom of a moving body such as a wheelchair. This can implement holonomic omni direction moving corresponding to side step with a moving body such as a wheelchair.

FIG. 9A shows the mode where the present system is disposed at three positions along the circumference of the bottom of a moving body, and they are preferably disposed at regular spacings. The disposition is not limited to regular-spacing positions along the circumference (apexes of a regular triangle), but may be at apexes of an isosceles triangle. They may be disposed appropriately at any positions suitable for the application. Two of them may be disposed in the front-back direction or a predetermined number of them may be disposed in the horizontal direction as well suitably for the application and the purpose. In the mode including a plurality of systems, e.g., two systems, the wheels may turn in mutual reverse directions and may turn in the same direction. The turning velocity of the wheels may be the same or different, and they may be synchronized in phase or may have a necessary phase difference therebetween. The turning velocity may be appropriately set suitably for the wheel diameter or their applications, and the number of revolutions may be several times or several tens times per second, for example. FIG. 9B shows the model limitedly including one system as the present system, and additionally including as other grounding points a horizontal pair of trailing wheels on one of the front and back sides thereof, on the front side in this mode. FIG. 9C shows a trochoid drive system 1', where the outer wheel rotates along a circle and the inner wheel is rotatable in the reverse direction in the space inside the circle of the outer wheel. In this case, although the system becomes complicated to some extent because of the torus configuration, it is especially effective to reduce the occupying space when they turn coaxially and in mutually reverse directions.

Figure 11:
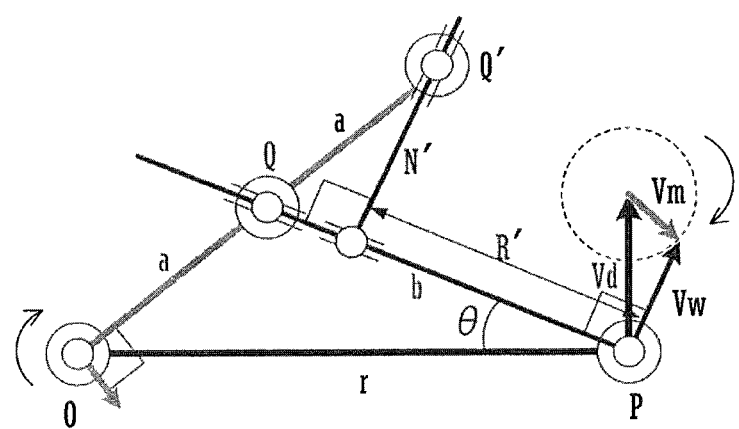
FIG. 11 is a simplified link of FIG. 5.

The present system proposes a link system to find an exact solution of a camber angle having a feasible complexity as in FIG. 5. However it is desirable to simplify the system even though the system does not have to withstand load. Then, for simplified derivation of the curvature radius R in FIG. 5, there is a method to approximate the value using the length of the side b. FIG. 11 shows another system.

FIG. 11 is a simplified link of FIG. 5. Virtual point Q' is set by extending side a from point O by a distance 2a in parallel to side a, and a perpendicular line is drawn from point Q' to side b to find intersection N' with side b. The distance from the steering axle P to N' can be estimated as a quasi-solution R', and using this R', an error for the camber angle can be reduced compared with FIG. 5.

Figure 12:
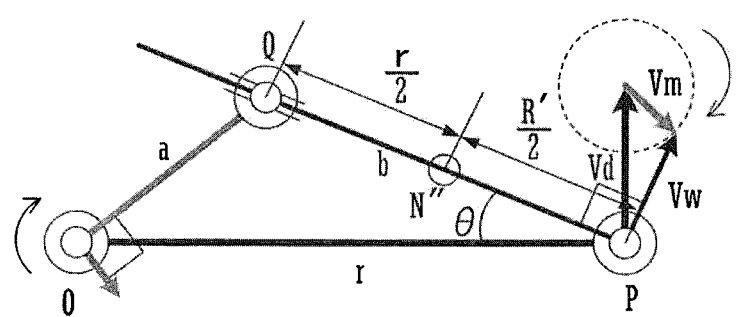
FIG. 12 shows the configuration of a horizontal part in the finally implemented link connection, where a distance 2a to a virtual point Q' is scaled to be ½ for a simplified link, and instead of R', a point N" where R'/2=b−r/2 is found.

In FIG. 12, the distance 2a to the virtual point Q' is scaled to be ½ for a simplified link, and instead of R', point N" where R'/2=b−r/2 is found. This shows the configuration of a horizontal part in the finally implemented link connection. FIG. 12 is an implementation example where the links having fixed lengths of R/2 and W/2 are locked at right angles, thus generating the camber angle in the ½ scaled link on the vertical face side. The configuration of the vertical part will be described later, referring to FIG. 12.

Figure 13:
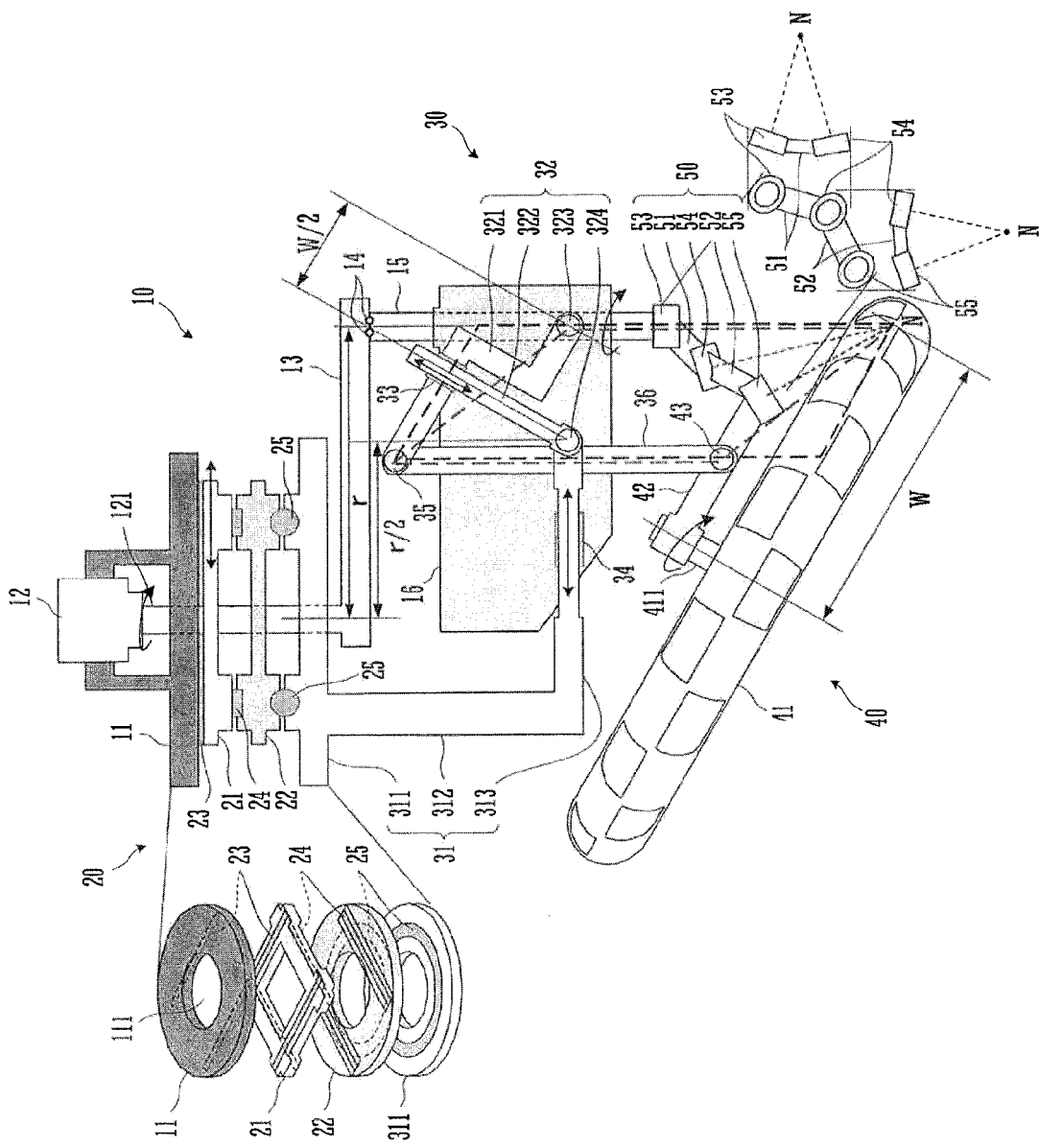
FIG. 13 shows a configuration in one embodiment of a specific system as the trochoid drive system.

FIG. 13 shows a configuration in one embodiment of a specific system as the trochoid drive system. Although FIG. 13 simply shows a trochoid drive system 1, a mode using the system 1 in a moving body such as a wheelchair 3 as shown in FIG. 10, for example, may include at least two of the systems 1 attached at a lower part (e.g., at the front-back positions) of a seat (main body) making up a chair 2. In such a mode, the present system other than wheels is preferably stored inside a cylindrical enclosure (see an enclosure 1a in FIG. 10) provided to stand erect at the bottom of the moving body. The system may be fixed to the enclosure 1a via a static system part such as a main body base 11 of a driving part 10, for example. The enclosure preferably has a height so that the upper end side of a wheel 41 in a camber state is exposed from the lower end of the enclosure, i.e., the wheel as a whole is exposed. The exposure of the wheel 41 as a whole from the enclosure enables a step climbing operation of the wheel at a step height corresponding to the upper end height of the wheel.

The trochoid drive system of FIG. 13 includes: the driving part 10, a steering operation part 20, a steering link part 30, a wheel part 40 and a spherical surface link part 50.

The driving part 10 in a mode used for a wheelchair, for example, includes the driving part 10 that is a board made of a robust material such as metal considering the load applied, in this example, an annular main body base 11 including a hole 111 bored at the center; a motor 12 mounted at the center and above the main body base 11 as one example of a driving source to give turning ability to the wheel 41; an arm 13 jointed from the lower end of an output axle 121 of the motor 12, the output axle 121 penetrating through the hole 111, to the horizontal direction (radial direction) and having a required length r (see FIG. 13); a steering axle 15 perpendicularly-rotatably and pivotally supported at the leading end of the arm 13 via a bearing 14 and having a predetermined length in the vertical direction; and a steering board 16 extending radially to rotate integrally with the steering axle 15. A power supply to drive the motor may be a battery.

The steering operation part 20 in the present embodiment includes a parallel-crosses plate 21 and an annular plate 22 making up a parallel-crosses shaped slider so that the parallel-crosses plate 21 and the annular plate 22 are directed in mutually perpendicular directions. The parallel-crosses plate 21 and the annular plate 22 are stacked, which are provided between the main body base 11 on the upper side and a steering board 311 on the lower side. Between the main body base 11 and the parallel-crosses plate 21 is provided a linear slider 23, which couples the parallel-crosses plate 21 to be relatively movable in one direction (horizontal direction in FIG. 13) with respect to the main body base 11. Between the parallel-crosses plate 21 and the annular plate 22 is provided a linear slider 24, which couples the annular plate 22 to be relatively movable in the direction (in the direction of sheet of FIG. 13) perpendicular to the one direction with respect to the parallel-crosses plate 21. The linear slider 23 and the linear slider 24 make up a parallel-crosses shaped slider. The annular plate 22 and the steering board 311 are coupled via a bearing 25 so as to allow the steering board 311 to rotate around a vertical axis and about a variable position during steering (around a virtual steering center axis) with the linear sliders 23 and 24. A method for the steering operation of the linear sliders 23 and 24 is described later.

The steering link part 30 includes a slide rail part 31 and a link system 32 provided between it and the steering board 16. The link system 32 includes: mutually perpendicular link arms 321, 322, a link axle 323 for pivotally supporting at a necessary part with the steering board 16; and a supporting axle 324 (corresponding to N″ in FIG. 12) to pivotally support a leading end of a below-described horizontal arm 313 of the slide rail part 31. The link arm 321 has a rotating axle 35 on the leading end side, at which a vertical arm 36 coupling with the wheel part 40 is pivotally supported. The slide rail part 31 includes a horizontal steering board 311, a vertical arm 312 extending downward from a predetermined part of the bottom face of the steering board 311 and the horizontal arm 313 extending horizontally from the lower end of the vertical arm 312. In the present embodiment, the horizontal arm 313 and the link axle 323 are set at the same height. That is, the distance between the link axle 323 and the supporting axle 324 corresponds to R'/2 of FIG. 12, and the rectangular triangle made up of three sides including this, the perpendicular line from the link axle 323 to the link arm 322 and a line from the intersection to the supporting axle 324 draws a similar shape of the ½ scale rectangular triangle having the long side at the NP on the floor surface NP to determine the camber angle of FIG. 6. In this way, the gradient of the link arm 321 is transmitted to a below-described supporting arm 42, whereby a camber angle for the wheel 41 can be reproduced.

Between the horizontal arm 313 and the steering board 16 is further provided a linear slider 34 that is directed horizontally, so as to allow the slide rail part 31 and the steering board 16 to move relatively in the horizontal direction. Specifically, the linear slider 34 includes a slide rail attached to one of the horizontal arm 313 and the steering board 16 and a moving body attached to the other side. Between the mutually perpendicular link arm 321 and link, arm 322, a linear slider 33 is provided so as to let the link arm 322 slide while keeping the link arm 322 perpendicular to the longitudinal direction of the link arm 321. Specifically, the linear slider 33 includes a slide rail attached to the link arm 321 side and includes a moving body attached to the link arm 322 side.

When the aforementioned steering is not performed, the distance from the output axle 121 to the supporting axle is set at r/2, whereby R'/2 (see FIG. 12) can be reproduced between the link axle 323 and the supporting axle 324. Thus similarly to the principle of FIG. 12, the gradient of the link arm 321 can be transmitted to the supporting arm 42, and so the camber angle can be reproduced for the wheel 41. This means that the camber angle corresponding to the steering angle can be always set. In this state, the tangential direction of the wheel 41 agrees with the turning direction of the steering axle 15. That is, to set the steering angle θ=0°, the steering board 16 is adjusted so as to be directed to the output axle 121. In this state, the present system stops where the wheel 41 simply turns but the system does not generate any moving component on the floor surface. Then, when the steering board 311 is displaced in any two-dimensional direction on the horizontal plane, the distance between the vertical arm 312 and the steering axle 15 changes in accordance with the displacement amount. To absorb such a change in distance, the steering board 311 rotates via the bearing 25, i.e., the slide rail part 31 rotates, and in response to the rotation, the steering board 16 rotates around the steering axle 15 via the linear slider 34 so as to be parallel to the horizontal arm 313 of the slide rail part 31, meaning that the steering axle 15 rotates. As a result, a new steering angle θ is set. Herein, the steering axle 15 turns around the output axle 121 with the radius r due to the rotation of the motor 12, whereas the horizontal arm 313 of the slide rail part 31 turns in a synchronized manner, but the radius from the output axle 121 always changes. That is, the steering angle changes with the turning period as shown in FIG. 1.

In the link system 32, the link arm 321 has its proximal end that is pivotally supported at the link axle 323 on the steering axle 15. The link arm 321 may have an elongated shape, and in the present embodiment the link arm 321 has a shape that is bent 90° at two parts along the elongated shape on the same plane so that the arm parts on the distal end side and the leading end side are kept parallel to each other. Then, the aforementioned slide rail making up the linear slider 33 is provided at the distance of W/2 from the supporting axle 324 at the elongated part on the leading end side of the link arm 321. To the leading end of the horizontal arm 313 is coupled the link arm 322 via the supporting axle 324, thus providing a link via the linear slider 33.

The following describes the function of the link system 32 relatinq to the steering of the steering link part 30. Assume herein that the slide rail part 31 is displaced (steered) to the right of FIG. 13 in the state of FIG. 13. Then, the horizontal arm 313 moves to the right, thus pulling the supporting axle 324 at the lower end of the link arm 322 to the right. Meanwhile, since the link arm 322 and the link arm 321 keep their perpendicular state due to the linear slider 33, the link arm 321 rotates around the link axle 323 while keeping this perpendicular state, and the angle becomes flattened (becomes close to horizontal), so that the link arm 322 stands up in a ganged manner. The flattened angle of the link arm 321 makes the leading end of the link arm 321, i.e., the rotating axle 35 rotate counterclockwise around the link axle 323. As a result, the vertical arm 36 moves to the right while descending. Since the lower end of the vertical arm 36 is coupled to the wheel part 40, and so the camber angle for the wheel 41 is adjusted in accordance with the movement of the vertical arm 36 as described later.

The wheel part 40 includes: the wheel 41 having a predetermined diameter; a wheel axle supporting arm 42 having a predetermined length that pivotally and rotatably supports the wheel axle 411 of the wheel 41; and a swinging axle 43 at the lower end of the vertical arm 36 that swingably supports the wheel axle supporting arm 42 at the middle position. The wheel axle 411 of the wheel 41 has an axis perpendicular to the axis of the steering axle 15. Then, steering is set so as to let the wheel axle 411 rotate around the steering axle 15, and camber is set so as to let the wheel axle 411 inclined on the face perpendicular to the face parallel to the steering angle. The wheel axle supporting arm 42 is elongated in the radial direction with reference to the wheel axle 411 and has a circular shape in cross section, for example. The swinging axle 43 is a horizontal axle that supports the wheel axle supporting arm 42 swingably at the vertical plane. The wheel 41 is made of a material having necessary friction resistance such as rubber at least at its outer skin.

The spherical surface link part 50 includes: link arms 51, 52; link axles 53, 55 functioning as coupling parts; and a link axle 54 functioning as a relay part. The link axle 53 is rotatably jointed at the lower end of the steering axle 15, and the link axle 55 is rotatably jointed at the leading end of the wheel axle supporting arm 42 in the oblique state with reference to the arm axis. Between the link axles 53 and 55 are provided the link arms 51, 52 that are jointed via the link axle 54. The spherical surface link part 50 is configured so that all of the link axles 53 to 55 have the axle center direction that are always directed to the grounding point N, whereby camber can be adjusted while keeping the grounding point N of the wheel 41 immediately below the steering axle 15 during adjustment of steering. Herein the spherical surface link part 50 may be any link system having the same function, which may be a parallel link system to associate a link to set a steering angle with a link to set a camber angle.

The wheel 41 is always in contact with the floor surface at the grounding point N immediately below the steering axle 15 (more precisely, at the wheel surface position that is lower by the radius of the tube cross section of the wheel 41), and the grounding point N rotates in synchronization with the turning of the steering axle 15 around the output axle 121 of the motor 12 corresponding to the driving axle. In this way, the wheel 41 changes in the steering angle in synchronization with the turning, and the camber angle changes in a ganged manner thereto, thus reducing travelling loss and keeping the travelling efficiency.

Letting that the distance between the output axle 121 and the steering axle 15 is r and the radius of the wheel W is w, $r \approx W$ and $r > W$ are requirements for the configuration. The camber angle holds under the requirements.

The steering may be manually operated or electrically operated. When it is manually operated, a steering lever may be provided so as to extend from an appropriate position of the annular plate 22 to the outside via a not-illustrated enclosure, and further extend upwardly from the seat of the wheelchair so as to allow an operator sitting on the seat to operate the lever. When it is electrically operated, actuators may be provided between the main body base 11 or a not-illustrated enclosure and the parallel-crosses plate 21 and the annular plate 22, so as to push and pull the parallel-crosses plate 21 and the annular plate 22 in their moving directions, and a driving part (e.g., a motor or a cylinder) to move the actuators may be provided. The system further may be provided with a remote controller that is operated by an operator sitting on the seat to transmit a signal for steering, and a reception part and a driving signal processing part on the driving part side. The remote controller may include a steering part that generates an instruction signal to instruct the steering amount in the front-back direction and the horizontal direction, and a transmission part to transmit a steering signal. The driving signal processing part on the driving part side may generate a moving amount signal (driving signal to the motor) to the left and right based on the signal that the reception part receives, and converts the signal into a driving signal to drive the motors using electricity from the power supply for outputting.

Herein, the present invention may be configured as in the following embodiments.

(1) The steering operation part 20 includes the parallel-crosses plate 21 and the annular plate 22 (the linear sliders 23 and 24) to enable movement in perpendicular two-axial directions, thus allowing steering two-dimensionally. Herein, the two axes are net limited to perpendicular directions. Steering may be in a uniaxial direction in some applications.

(2) The above embodiment does not describe especially the stopping attitude of the wheel when the driving by the motor 12 is stopped. The attitude of the wheel may be shifted (grounding with the entire side face of the wheel 41) so that the camber angle becomes 90° using the weight of the main body or the weight of a passenger. This allows the configuration of a single wheel as well to have the erect attitude during stopping and keep the stopping balance. This further allows the wheel to have a very large grounding area, which cannot be achieved in the conventional example using a wheel, and so such a configuration is preferable for applications to construction machinery, heavy machinery and the like. Further, immediately shifting to this state from the traveling state allows the system to have a strong sudden braking ability.

(3) The wheel may have a radius corresponding to the width of the moving body on the short side of the bottom part, thus setting a large camber angle. Thereby, higher step-climbing (step-rising) ability can be achieved, and propulsion power for climbing also can be maximized.

(4) The above embodiment exemplifies the example of using a plurality of trochoid driving apparatuses to a wheelchair. The present invention, however, is not limited to this, and is similarly applicable to various moving bodies carrying a human as well as a moving body by providing such an apparatus at a bottom of a robot or a main body for conveyance, for example. The present invention is further effective to control the center of gravity of an inverted pendulum type having a high center of gravity as holonomic characteristics in the two-dimensional direction in the horizontal plane.

As stated above, a trochoid drive system according to the present invention includes: a supporting part to support a trailing-type wheel having a wheel axle perpendicular to a steering axle that is located at a predetermined distance from a driving axle, turns about the driving axle, and is parallel to the driving axle; and a steering part that turns in synchronization with the steering axle, the steering part being configured so that a position thereof relative to the driving axle is displaceable on a turning plane. The steering part preferably includes: a first link system configured to adjust a steering angle of the wheel by rotating the wheel axle about the steering axle in association with the displacement; and a second link system jointed to the first link system to adjust a camber angle of the wheel by tilting the wheel axle by an angle corresponding to the steering angle on a plane perpendicular to a plane parallel to the steering angle.

This invention allows the steering angle and the camber angle of a wheel to be adjusted in a mechanically ganged manner, thereby reducing friction resistance during travelling and improving the travelling efficiency of the driving system.

In the above trochoid drive system, the steering part preferably includes two mutually perpendicular linear sliders on the turning plane. This configuration enables moving in a two-dimensionally desired direction on the turning plane.

In the above trochoid drive system, when displacement of the steering part does not occur for steering, a distance from the driving axle to an axis of turning center of the steering part is ½ of the distance from the driving axle to the steering axle. This configuration can set a camber angle closer to an exact solution.

A moving body preferably includes at least one of the above trochoid drive system at a bottom part of a main body thereof. This configuration enables tilting at a larger camber angle for rotation by using a large-diameter wheel, and such a configuration can realize the system having a high step-climbing ability. The embodiment including one trochoid drive system may include at least one simple wheel such as a caster or may include two or more or a predetermined number of two or more of trochoid drive systems, whereby balance of the attitude of the moving body during stopping can be kept.

In the above moving body, the wheel has a diameter corresponding to a short-side width of the bottom part of the main body. This configuration allows the wheel to have a maximum diameter within the width of the bottom part of the main body of the moving body and allows a large camber angle to be set, whereby the system can climb a higher step and can have large propulsion power for climbing.

REFERENCE SIGNS LIST 1,1' Trochoid drive system
2 Chair (main body)
3 Wheelchair (moving body)
10 Driving part (a part of supporting part)
11 Main body base
12 Motor
121 Output axle (driving axle)
13 Arm
14 Bearing
Steering axle
15 Steering board (a part of first link system)
16 Steering operation part (a part of steering part)
21 Parallel-crosses plate
22 Annular plate
23 Linear slider
24 Linear slider
25 Bearing
30 Steering link part (a part of steering part)
31 Slide rail part
32 Link system (a part of first and second link system)
321, 322 Link arm (a part of second link system)
323 Link axle (a part of second link system)
324 Supporting axle (a part of first link system)
33 Linear slider (a part of second link system)
34 Linear slider (a part of first link system)
35 Rotating axle (a part of second link system)
36 Vertical arm (a part of supporting part and second link system)
311 Steering board.
312 Vertical arm
313 Horizontal arm
40 Wheel part
41 Wheel
411 Wheel axle
42 Wheel axle supporting arm (a part of supporting part and second link system)
43 Swinging axle (a part of supporting part and second link system)
50 Spherical surface link part (a part of supporting part and first and second link system)
51,52 Link arm
53,54,55 Link axle
N Grounding point

The invention claimed is:

1. A trochoid drive system comprising:
a supporting part to support a trailing wheel having a wheel axle with a wheel axle axis which corresponds to an angle with an axis of a steering axle, wherein the steering axle is located at a predetermined distance from a driving axle, turns about the driving axle, and is parallel to the driving axle; and
a steering part that turns in synchronization with the steering axle, the steering part being configured so that a position thereof relative to the driving axle is displaceable on a turning plane, wherein
the steering part includes: a first link system configured to adjust a steering angle of the wheel by rotating the wheel axle about the steering axle in association with a displacement of said displaceable position of the steering part; and
a second link system to adjust a camber angle of the wheel by tilting the wheel axle by an angle corresponding to the steering angle on a plane perpendicular to a plane parallel to the steering angle; and
wherein a jointed link part common to said first link system and second link system allows the camber angle to be changed while the steering angle is being changed.

2. The trochoid drive system according to claim 1, wherein the steering part includes two mutually perpendicular linear sliders on the turning plane.

3. The trochoid drive system according to claim 1, wherein when displacement of the steering part does not occur for steering, a distance from the driving axle to an axis of turning center of the steering part is ½ of the distance from the driving axle to the steering axle.

4. A moving body comprising at least one of the trochoid drive system according to claim 1 at a bottom part of a main body thereof.

5. The moving body according to claim 4, wherein the wheel has a diameter corresponding to a short-side width of the bottom part of the main body.

6. A trochoid drive system comprising:
- a supporting part that supports a trailing wheel and that can be turned around a wheel axle; and
- a steering part to adjust a steering angle and a camber angle of the wheel;
- wherein the supporting part extends radially to rotate integrally with a steering axle that is located at a predetermined distance from a driving axle, turns about the driving axle, and is parallel to the driving axle, and keeps a grounding point of the wheel immediately below the steering axle through a spherical surface link or a parallel link system jointed at a lower end of the steering axle;
- wherein the steering part turns in synchronization with the steering axle, and is configured so that a position thereof relative to the driving axle is displaceable on a turning plane; and
- wherein the steering part comprises:
  - a first link system supported on a steering board and configured to adjust a steering angle of the wheel by rotating the wheel axle about the steering axle in association with a displacement of said displaceable position of the steering part; and
  - a second link system supported on the steering board to adjust a camber angle of the wheel by tilting the wheel axle by an angle corresponding to the steering angle on a plane perpendicular to a plane parallel to the steering angle; and
- wherein a jointed link part common to said first link system and second link system allows the camber angle to be changed while the steering angle is being changed.

* * * * *